United States Patent
Yhr et al.

(10) Patent No.: US 12,358,377 B2
(45) Date of Patent: Jul. 15, 2025

(54) ELECTRICAL WHEEL MODULE FOR ACCELERATION AND BRAKING OF A HEAVY-DUTY VEHICLE

(71) Applicant: VOLVO TRUCK CORPORATION, Gothenburg (SE)

(72) Inventors: Hamid Yhr, Gråbo (SE); Leo Laine, Härryda (SE); Ulf Stenbratt, Vallda (SE); Mats Rydström, Billdal (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 186 days.

(21) Appl. No.: 18/262,824

(22) PCT Filed: Jan. 27, 2021

(86) PCT No.: PCT/EP2021/051867
§ 371 (c)(1),
(2) Date: Jul. 25, 2023

(87) PCT Pub. No.: WO2022/161602
PCT Pub. Date: Aug. 4, 2022

(65) Prior Publication Data
US 2024/0123832 A1    Apr. 18, 2024

(51) Int. Cl.
*B60L 7/18* (2006.01)
*B60L 7/22* (2006.01)
(Continued)

(52) U.S. Cl.
CPC ............... *B60L 7/18* (2013.01); *B60L 7/22* (2013.01); *B60L 7/28* (2013.01); *H02K 49/046* (2013.01);
(Continued)

(58) Field of Classification Search
None
See application file for complete search history.

(56) References Cited

U.S. PATENT DOCUMENTS

| 8,494,699 B2 | 7/2013 | Bourqui et al. |
| 8,639,421 B2 * | 1/2014 | Harnisch ............ B66F 9/24 |
| | | 180/65.21 |

(Continued)

FOREIGN PATENT DOCUMENTS

| KR | 20090089513 A | 8/2009 |
| WO | 2004071800 A1 | 8/2004 |
| WO | 2013186158 A2 | 12/2013 |

OTHER PUBLICATIONS

International Search Report and Written Opinion in corresponding International Application No. PCT/EP2021/051867 mailed Oct. 22, 2021 (15 pages).

(Continued)

*Primary Examiner* — Todd Melton
(74) *Attorney, Agent, or Firm* — Venable LLP; Jeffri A. Kaminski

(57) ABSTRACT

A wheel module arranged to generate torque to accelerate and to decelerate a heavy-duty vehicle. The wheel module comprises at least one electric machine arranged for regenerative braking, an eddy current braking device, and an electronic control unit, ECU. The wheel module further comprises a communications port arranged for communication with an external control unit and a power distribution network arranged to connect the electric machine to the eddy current braking device and to a power port arranged to input and to output electrical power to and from the wheel module. The ECU is arranged to obtain configuration data via the communications port indicative of a maximum output power of the power port, and to control the power distribution network to maintain the output power of the power port below the maximum output power by distributing power from the at least one electric machine between the eddy current braking device and the power port.

13 Claims, 6 Drawing Sheets

(51) Int. Cl.
*B60L 7/28* (2006.01)
*H02K 49/04* (2006.01)
(52) U.S. Cl.
CPC ..... *B60L 2240/12* (2013.01); *B60L 2240/461* (2013.01); *B60L 2240/463* (2013.01); *B60L 2240/465* (2013.01)

(56) References Cited

U.S. PATENT DOCUMENTS 10,688,877 B2 6/2020 Glück
2019/0241077 A1 8/2019 Glück

OTHER PUBLICATIONS

International Preliminary Report on Patentability in corresponding International Application No. PCT/EP2021/051867 mailed May 9, 2022 (7 pages).

* cited by examiner

ELECTRICAL WHEEL MODULE FOR ACCELERATION AND BRAKING OF A HEAVY-DUTY VEHICLE

CROSS-REFERENCE TO RELATED APPLICATIONS

This application is a U.S. National Stage application of PCT/EP2021/051867, filed Jan. 27, 2021 and published on Aug. 4, 2022, as WO 2022/161602, all of which is hereby incorporated by reference in its entirety.

TECHNICAL FIELD

The present disclosure relates to heavy-duty vehicles such as semi-trailer vehicles for cargo transport, and in particular to integrated electrical arrangements for decelerating the heavy-duty vehicle based on combinations of electrical braking devices. Although the invention will be described mainly with respect to semi-trailer vehicles and trucks, the invention is not restricted to this particular type of vehicle but may also be used in other types of vehicles.

BACKGROUND

A heavy-duty vehicle, such as a truck or semi-trailer vehicle, normally comprises a service brake system based on friction brakes. Friction brakes, such as disc brakes or drum brakes, are not capable of prolonged periods of use which may occur when driving downhill for an extended period of time. If the friction brakes are used too intensively, a phenomenon referred to as brake fading may occur. Brake fading is caused by a build-up of heat in the braking surfaces and leads to significantly reduced braking capability. To avoid brake fading, heavy-duty vehicles often comprise auxiliary brakes capable of endurance braking, such as engine brakes and various retarder systems.

Electric machines can also be used to brake a vehicle, i.e., to generate braking torque. The electric machine then acts as a generator which converts the kinetic energy from the vehicle into electrical energy. This electrical energy can be fed to an electrical energy storage system (ESS) such as a rechargeable battery, or to a brake resistor which dissipates the electrical energy as heat.

Electric machines do not suffer from brake fading, but since the total energy absorption capability of the ESS and brake resistor is limited, the electric machine may still not be able to perform endurance braking for prolonged periods of time. Thus, either additional means for braking need to be installed in the vehicle, or the requirements on the electrical energy system of the vehicle must be over-dimensioned to support endurance braking, which is undesired.

Electric machines are normally associated with a limited peak braking torque capability, which means that electric vehicles often comprise friction brakes in addition to the electric machines in order to provide the necessary torque required for, e.g., emergency braking. WO 2013/186158 discloses a type of vehicle brake arrangement based on a combination of an electric machine and an eddy current brake. This arrangement is able to generate more torque compared to the electric machine alone.

There is a continuing need for further improvements in braking arrangements for heavy-duty vehicles which are able to provide sufficient braking torque, also for extended periods of time. It is also desired to simplify control of the ESS system on the vehicle.

SUMMARY

It is an object of the present disclosure to provide braking arrangements for decelerating a heavy-duty vehicle which alleviate at least some of the above-mentioned issues.

This object is at least in part achieved by a wheel module arranged to generate torque to accelerate and to decelerate a heavy-duty vehicle. The wheel module comprises at least one electric machine arranged for regenerative braking, an eddy current braking device, and an electronic control unit, ECU. The wheel module further comprises a communications port arranged for communication with an external control unit and a power distribution network arranged to connect the electric machine to the eddy current braking device and to a power port arranged to input and to output electrical power to and from the wheel module. The ECU is arranged to obtain configuration data via the communications port indicative of a maximum output power of the power port, and to control the power distribution network to maintain the output power of the power port below the maximum output power by distributing power from the at least one electric machine between the eddy current braking device and the power port.

The wheel module is preferably connected to at least one electrical energy absorption device, which can, e.g., be an ESS, such as a rechargeable battery or a super-capacitor, or a device that dissipates electrical energy, such as a brake resistor, or a combination of ESS and brake resistor. The disclosed wheel module provides regenerative braking for charging an ESS or the like, while, at the same time, taking the limitations of the ESS, and any other electrical energy absorption devices, into account by limiting the amount of output power in dependence of the configuration data. The communications port is connected to an upper layer control device, i.e., external control unit, which can configure a maximum energy output from regenerative braking in real time. The internal control, i.e., the ECU, will then regulate output power to always be below the configured maximum energy output by diverting regenerated energy to the eddy current braking device instead of to the output power port on the module. This reduces requirements imposed on braking resistors and on energy storage systems, or other electrical energy absorption devices, which is an advantage. This also simplifies dimensioning of the overall vehicle electrical system, since a maximum output power from the wheel module can be assumed. The wheel module may also report a braking capability via the communications port in real time, such that an external control unit is aware of the current braking capability of the wheel module at any given time. This capability is a function of the condition of the eddy current device, and the state of the electric machine, e.g., the axle speed of the electric machine.

According to aspects, the electric machine is arranged to generate an increased amount of braking torque, sometimes referred to as peak braking torque, for a limited amount of time. A current generated by the electric machine during that limited amount of time is diverted to the eddy current braking device, thereby increasing a total amount of braking torque. By operating the electric machine at peak torque, the electric machine is able to generate a significantly increased torque, but only for a limited amount of time. The current generated during such torque overload can be diverted to the eddy current brake and thereby obtain a further increase in braking torque. In this case, the communications port can be configured to report the braking torque capability in real-time to the upper layer control. This report may both comprise the torque capability and also the time duration for which this torque can be maintained. Optionally, a rate of decline in braking torque capability can also be reported, which rate of decline can be determined from a model or preconfigured look-up table. Being able to generate high braking torque for a limited duration of time means that emergency braking operations and the like can be performed without additional braking torque from frictions brakes or the like, even for a heavily laden heavy-duty vehicle, which is an advantage. The reported braking capability will of course decrease if this function is used repeatedly in a limited duration of time, but since the vehicle control system becomes aware of the current capability via the reports, this can be accounted for by the vehicle motion management control system.

According to aspects, the wheel module further comprises a local energy buffer, i.e., some kind of ESS, like a battery or a super capacitor. This buffer can serve two purposes. It can even out the output power from the power port such that higher layer charging control systems will receive a more predictable energy output from the device over time with less rapid fluctuations, i.e., a smoothed or low-pass filtered power output. The buffer can also function as a back-up energy source in case the main vehicle energy source should fail for some reason. This back-up energy source can, for instance, provide emergency braking via the eddy current braking device for a limited duration of time in case of main energy source failure. The back-up energy source can also provide a boost power for the eddy current device in case the electric machine is not able to generate sufficient output power, e.g., due to a high axle speed.

According to aspects, the ECU is arranged to control the electric machine and the eddy current braking device to provide a desired wheel slip level, i.e., a local wheel slip control is achieved through coordination of the electric machine and the eddy current braking device. This allows for high bandwidth control that performs with high accuracy and high speed to regulate wheel slip towards a target wheel slip value. The complexity inherent in this type of motion control is largely contained to the wheel module, which simplifies control of the overall vehicle control systems. Also, the functionality can be verified separately since the functions are comprised in a single unit delivered and assembled as one part with well-defined interfaces towards the rest of the vehicle.

According to aspects, the wheel module comprises an additional communications port. This provides redundancy to the control system. Any of the communications port and the additional communications port can be a wireless or a wired communications port.

According to aspects, the ECU is configured to distribute regenerated electrical power from the electric machine between the eddy current braking device and the power port by the power distribution network in dependence of a target deceleration value of the heavy-duty vehicle. This enables a reliable way of decelerating the vehicle and also allows deceleration by the wheel module in excess of the braking capability of the electric machine alone. Thus, the external control unit, which may be a main vehicle motion control unit, may request a braking torque from the wheel module (potentially indirectly as a wheel slip request) in excess of the capability of the electric machine without configuring a split between braking by the electric machine and braking by the eddy current device. This simplifies overall vehicle control.

According to aspects, the ECU is configured to control the distribution of regenerated electrical power from the electric machine between the eddy current braking device and the power port such that a constant baseline torque level is generated by the eddy current braking device. The torque applied by the electric machine is modulated to control wheel slip at a desired wheel slip level. With the eddy current braking device generating a baseline torque level, the electric machine can be used to control wheel slip with low latency, thereby obtaining accurate and fast wheel slip control. This also means that the eddy current device will not interfere in the wheel slip control, which is an advantage.

According to aspects, the electric machine, the eddy current braking device, and the ECU are integrally formed in a single unit. This simplifies vehicle assembly and also provides a simple interface to the combined brake functions of the electric machine and the eddy current device. Also, the integrally formed single unit can be verified as a unit in terms of functionality.

According to aspects, the electric machine is an axial flux electric machine. An axial flux electric machine can be made relatively flat and can therefore be integrated together with an eddy current device more easily, which is an advantage.

There is also disclosed herein a heavy-duty vehicle unit comprising one or more wheel modules according to the discussions above, and an external control unit arranged to control vehicle motion.

There is also disclosed herein a method for decelerating a heavy-duty vehicle, performed by an electronic control unit, ECU, comprised in a wheel module. The wheel module also comprises at least one electric machine arranged for regenerative braking, an eddy current braking device, a communications port arranged for communication with an external control unit and a power distribution network arranged to connect the electric machine to the eddy current braking device and to a power port arranged to input and to output electrical power to and from the wheel module. The method comprises:

obtaining a deceleration request indicative of a desired braking torque, obtaining configuration data via the communications port indicative of a maximum output power of the power port, applying braking torque by any of the electric machine and the eddy current braking device, and controlling the power distribution network to maintain the output power of the power port below the maximum output power by distributing power from the at least one electric machine between the eddy current braking device and the power port.

According to aspects, the method further comprises applying an increased amount of torque by the electric machine for a limited amount of time, and diverting a current generated by the electric machine during that limited amount of time to the eddy current braking device, thereby increasing a total amount of braking torque.

According to aspects, the method further comprises controlling the electric machine and the eddy current braking device to provide a desired wheel slip level.

There is also disclosed herein an electronic control unit, ECU, comprising processing circuitry configured to perform a method according to the discussion above.

There is also disclosed herein a computer program comprising program code means for performing a method according to the discussion above when said program is run on a computer or on processing circuitry of an electronic control unit, ECU.

Generally, all terms used in the claims are to be interpreted to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. Further features of, and advantages with, the present invention will become apparent when studying the appended claims and the following description. The skilled person realizes that different features of the present invention may be combined to create embodiments other than those described in the following, without departing from the scope of the present invention.

BRIEF DESCRIPTION OF THE DRAWINGS

With reference to the appended drawings, below follows a more detailed description of embodiments of the invention cited as examples. In the drawings.

DETAILED DESCRIPTION OF EXAMPLE EMBODIMENTS OF THE INVENTION

Figure 1:
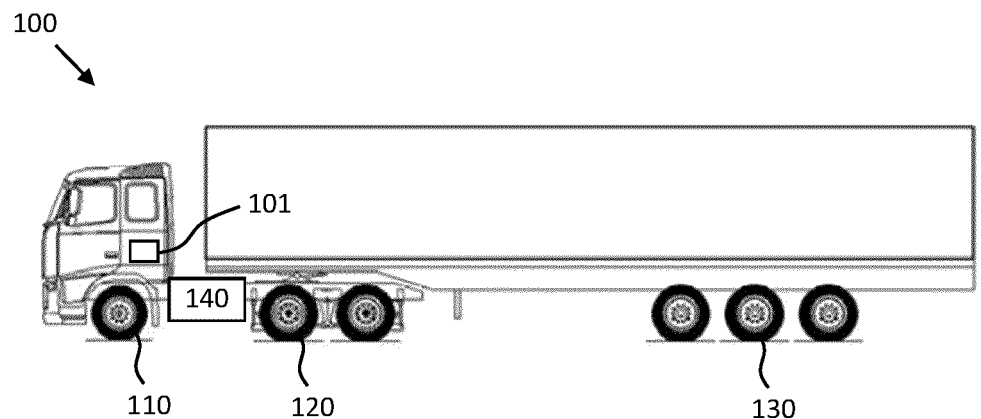
FIG. 1 shows an example heavy-duty vehicle.

The invention will now be described more fully hereinafter with reference to the accompanying drawings, in which certain aspects of the invention are shown. This invention may, however, be embodied in many different forms and should not be construed as limited to the embodiments and aspects set forth herein; rather, these embodiments are provided by way of example so that this disclosure will be thorough and complete, and will fully convey the scope of the invention to those skilled in the art. Like numbers refer to like elements throughout the description.

It is to be understood that the present invention is not limited to the embodiments described herein and illustrated in the drawings; rather, the skilled person will recognize that many changes and modifications may be made within the scope of the appended claims.

FIG. 1 illustrates an example heavy-duty vehicle combination 100 for cargo transport. The vehicle combination 100 comprises a truck or towing vehicle configured to tow a trailer unit in a known manner, e.g., by a fifth wheel connection. Each of the vehicle units comprise means for generating negative torque, i.e., a braking torque to decelerate the vehicle combination 100. The vehicle combination 100 comprises wheels 110, 120, and 130. The combination further comprises an ESS 140 such as a rechargeable battery, and a control unit 101 for, i.a., controlling motion of the vehicle combination. Vehicle control will be discussed in more detail below in connection to FIG. 6.

Herein, a heavy-duty vehicle 100 is taken to be a vehicle designed for the handling and transport of heavier objects or large quantities of cargo. As an example, a heavy-duty vehicle could be a semi-trailer vehicle, or a truck as described above. As another example, a heavy-duty vehicle could be a vehicle designed for use in construction, mining operations, and the like. It is appreciated that the techniques and devices disclosed herein can be applied together with a wide variety of electrically powered vehicle units, not just those exemplified in FIG. 1. Thus, the techniques disclosed herein are also applicable to, e.g., rigid trucks and also multi-trailer electric heavy-duty vehicles comprising one or more dolly vehicle units.

The truck, and potentially also the trailer unit, may comprise electric machines for propulsion and regenerative braking. However, most regenerative electric brakes are not capable of generating enough braking torque to perform hard braking, such as may be required during an emergency braking maneuver or the like, where accelerations on the order of −0.25 G to −0.75 G may be required. A heavy-duty vehicle such as the vehicle 100 therefore normally comprises friction brakes to complement the regenerative braking by the electric machine or machines.

However, as mentioned above, it is required to be able to brake the vehicle 100 as it travels down steep long hills and the like, where friction brakes risk onset of brake fading. Thus, an endurance braking system, such as an engine brake or hydraulic brake system for prolonged periods of braking may be required in addition to the regenerative brakes and the friction brakes. This rather complicated braking system drives cost and also requires extensive servicing.

Figure 2:
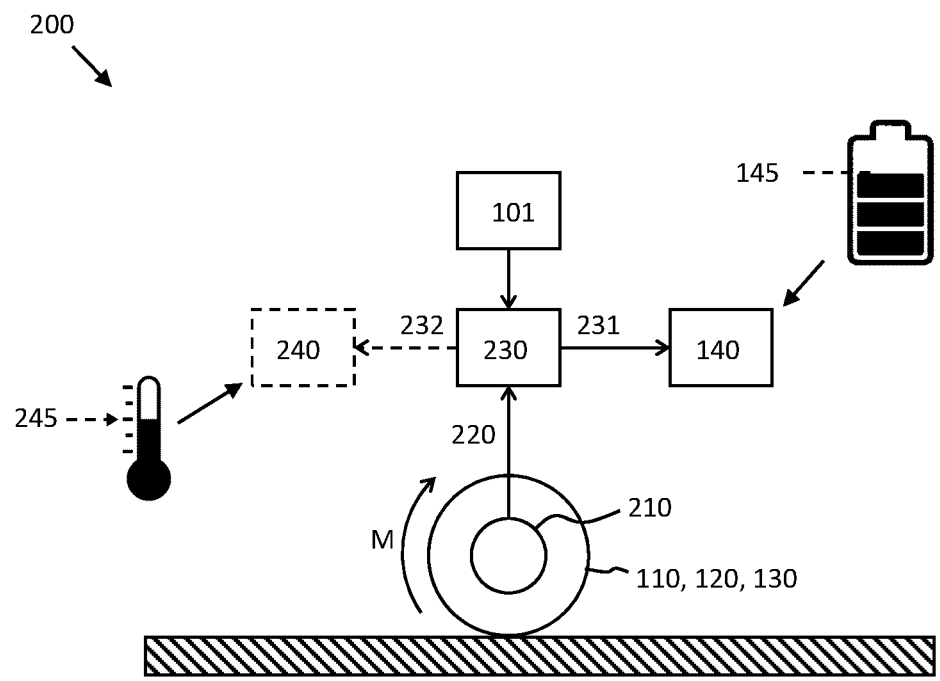
FIG. 2 illustrates an example electric braking arrangement for braking a vehicle unit.

FIG. 2 shows an example regenerative braking system 200 comprising an electric machine 210 coupled to a wheel 110, 120, 130, which could be any wheel in the vehicle combination 100. The electric machine 210 is connected to at least one electrical energy absorption device 140, 240, which can, e.g., be an ESS 140, such as a rechargeable battery or a super-capacitor. An electrical energy absorption device can also be a device that dissipates electrical energy, such as a brake resistor 240 which converts the electrical energy to heat without providing any useful effect such as braking or energy storage. A brake resistor may also regulate voltage and current levels of the braking arrangement. An electrical energy absorption device may also be a combination of devices that store electrical energy and devices that dissipate electrical energy.

In FIG. 2, the electric machine 210 is connected to an ESS 140. Electrical energy 220 from the electric machine 210 generated during braking (moment M) is fed 231 to the ESS as long as the ESS can absorb the power. When the ESS is fully charged 145 no more energy can be absorbed by it. Furthermore, there may be a limit on maximum current or voltage that can be fed to the ESS when charging. If the ESS cannot accept all energy from the electric machine, surplus energy can be fed 232 to a brake resistor 240 which dissipates the surplus energy as heat. The braking system 200 therefore comprises a switch or power distribution network 230, which is arranged to distribute the generated electrical energy from the electric machine 210 between the ESS and the brake resistor. It is appreciated that this device 230 can be implemented as a switch arranged to select destination of all of the power from the electric machine, or as a more complicated power electronics network configured to distribute one part of the power to the ESS and another part to the brake resistor. The brake resistor has a maximum amount of power it can absorb since it will eventually get too hot 245. Furthermore, there is normally a peak power capability of the brake resistor, i.e., there may be a limit on maximum current or voltage that can be fed to the brake resistor. The system 200 also comprises an external control unit 101 arranged to send a braking request to the electric machine 210 and arranged to control the switch or power distribution network 230.

If the battery is fully charged and if the brake resistor has reached a maximum allowable temperature, there is no safe way of dispersing the power generated from the electric machine 210 during braking. In that case, regenerative braking must cease. This problem can be alleviated somewhat by over-dimensioning the brake resistor, but that may not be sufficient, e.g. if the vehicle 100 is travelling down a long slope. For this reason, additional braking means, such as friction brakes, are required. They are also required since, as mentioned, electric machines normally have limited peak braking torque capability. Friction brakes, however, risk onset of brake fading when the vehicle travels down steep long hills and the like.

Figure 3:
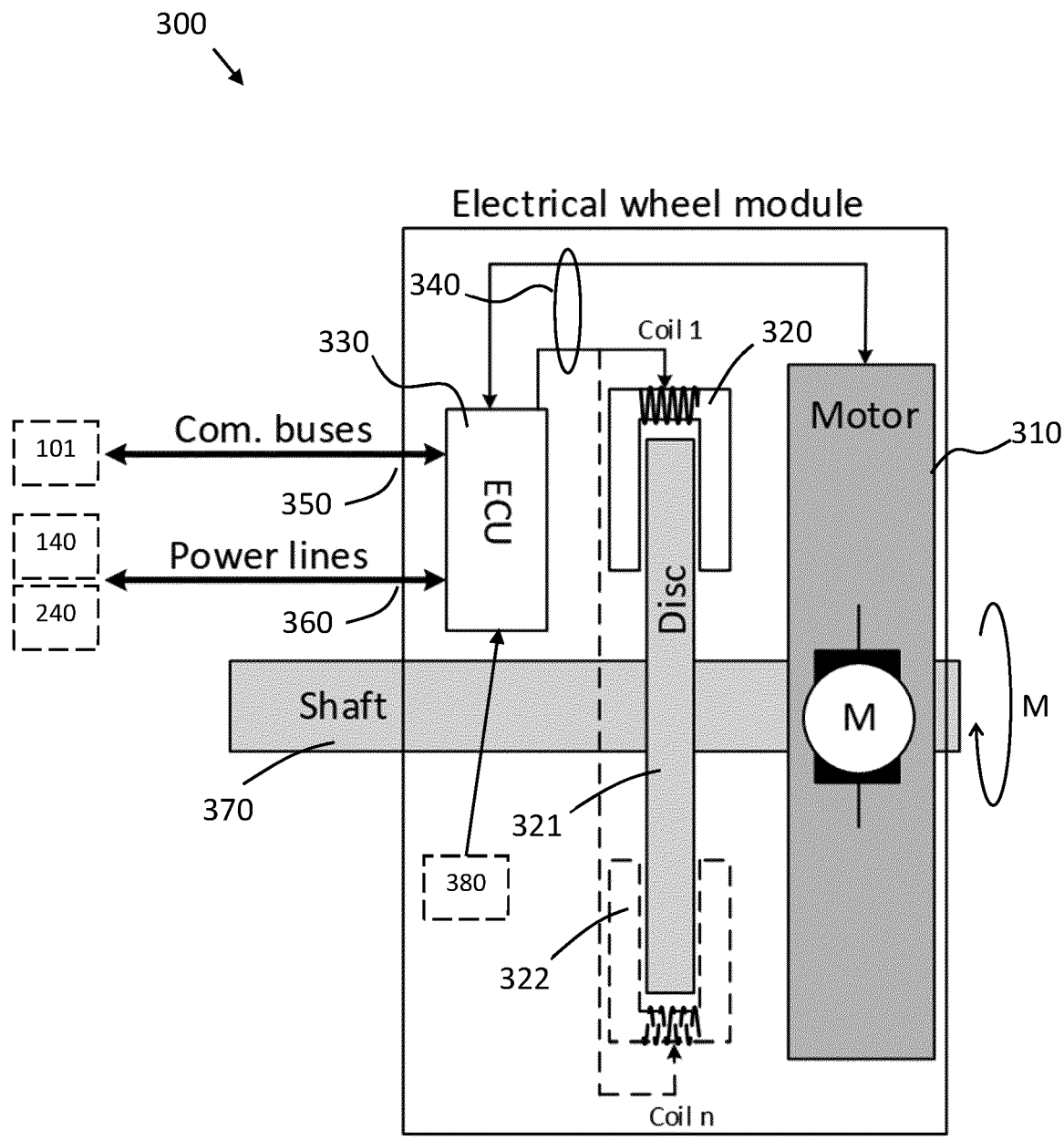
FIG. 3 illustrates an integrated electrical wheel module.

FIG. 3 shows an example wheel module 300 according to the present disclosure. The wheel module 300 is arranged to generate torque M to accelerate and to decelerate a heavy-duty vehicle 100 by at least one electric machine 310 arranged for regenerative braking. The module 300 also comprises an eddy current braking device 320 and an electronic control unit (ECU) 330. The wheel module 300 further comprises a communications port 350 arranged for communication with an external control unit 101 and a power distribution network 340 arranged to connect the electric machine 310 to the eddy current braking device 320 and to a power port 360 arranged to input and to output electrical power to and from the wheel module 300. The ECU 330 is arranged to obtain configuration data via the communications port 350 indicative of a maximum output power of the power port 360, and to control the power distribution network 340 to maintain the output power of the power port 360 below the maximum output power by distributing power from the at least one electric machine 310 between the eddy current braking device 320 and the power port 360.

The power port 360 can be connected to an ESS 140 and/or any other type of electrical energy absorption device such as a brake resistor 240. When connected to a plurality of electrical energy absorption devices, the ECU may provide the functionality of the switch 230, but this switch 230 can also be provided external to the wheel module. The wheel module 300 comprises a communications port 350 where an upper layer control device, i.e., an external control unit such as a main vehicle control unit for motion control, can configure a maximum energy and/or power output from regenerative braking in real time, i.e., on a time scale of a few milliseconds up to perhaps a second or longer. The wheel module internal control unit, i.e., the ECU 330, will then regulate output power to always be below the configured maximum energy and/or power output by diverting regenerated energy to the eddy current braking device instead of to the output power port on the module. This reduces requirement on external braking resistors and also on the main traction battery system, which is an advantage.

The external control unit 101 is arranged to send a braking request to the wheel module 300. This request is received by the ECU 330 via the communications port 350. The ECU then configures the electric machine to be in a regenerative mode where a braking torque is applied to the motor axle, and power is output from the electric machine. During regenerative braking, the electric machine 310 generates electric power which is transmitted to the power distribution network. The distribution network is arranged to distribute the generated electric power between electric machine 310, the eddy current braking device 320, and the power port 360 in dependence of the ECU, which in turn receives input from the external control unit 101 over the communications port 350.

The wheel module 300 also reports a braking capability via the communications port 350. This braking capability may change in dependence of the configured maximum output power on the power port. The braking capability may also change in dependence of a state of the eddy current braking device and/or a state of the electric machine. For instance, an overheated eddy current device may result in a reduced reported braking capability. Thus, the external control unit always has knowledge of current braking capability and maximum output power from the wheel module 300. This simplifies overall control of the vehicle also and the management of the vehicle electrical system in general, which is an advantage.

As an example, if a large deceleration value of the vehicle 100 is required, the corresponding required negative torque may exceed what can be generated by the electric machine 310 alone. A larger fraction of the regenerated electric power may then be directed to the eddy current braking device 320, which will in turn generate a negative torque, resulting in a larger total negative torque than that produced by the electric machine 310 alone. This way a very strong braking force can be generated, which is an advantage.

As another example, if the capacity of the energy absorption device 140, 240 is insufficient to absorb the regenerated electric power at some point in time, a larger fraction of the regenerated electric power may be directed to the eddy current braking device 320 even if the required torque for braking could be produced solely by the electric machine 310. This is achieved by the ECU 330 being arranged to control the power distribution network 340 to maintain the output power of the power port 360 below the maximum output power by distributing power from the at least one electric machine 310 between the eddy current braking device 320 and the power port 360. Directing the regenerated electric power to the eddy current braking device 320 will result in an additional negative torque being generated by the eddy current braking device 320. This serves both to dissipate the excess regenerated electric power and to decrease the negative torque that needs to be produced by the electric machine 310, resulting in less electric power being regenerated by the regenerative braking. This way the specification and requirements imposed on the peak energy absorption capability of the energy absorption device can be relaxed, which is an advantage. Normally, a zero output power can be maintained, at least for some time, in case no energy absorption capability is present external to the wheel module 300, e.g., if the traction batteries are fully loaded and the brake resistor or resistors are over-heated.

The configuration data indicative of a maximum output power of the power port can be configured based on an energy absorption capability of the energy absorption device 140, 240. An energy absorption capability of the energy absorption device 140, 240 includes a maximum amount of energy that the energy absorption device 140, 240 can absorb without sustaining damage. An energy absorption capability therefore includes a maximum rate of energy absorption by the energy absorption device 140, 240, i.e., a maximum power.

For a battery 140, an energy absorption capability may be determined at least in part by the difference between the current state of charge of the battery 140 and the maximum charge of the battery 140. For example, if the battery is fully charged, the energy absorption capability may be zero.

There is also normally a limit on the rate at which a battery can absorb energy, i.e., a limit on input power to the battery. For a brake resistor 240, an energy absorption capability may be determined by the power rating of the brake resistor 240, i.e., the amount of power that can be dissipated via the brake resistor 240 without causing it to overheat or become damaged. It is appreciated that the energy absorption capability of a device can vary over time, both short-term and long-term. For instance, an already overheated brake resistor will have a smaller energy absorption capability compared to a cool un-used brake resistor, causing variation over time-spans such as tens of minutes or even tens of seconds. A new battery often has better energy absorption capabilities compared to an older more worn battery; thus the energy absorption capability may also range over a time span of months or even years.

The energy absorption device outside the wheel module may comprise a rechargeable battery 140, and the ECU 330 may be configured to control the distribution of regenerated electrical power from the electric machine 310 between the rechargeable battery 140 and the eddy current braking device 320 in dependence of a state of charge (SOC) of the rechargeable battery 140. In particular, a larger fraction of the regenerated electrical power may be directed to the rechargeable battery 140 if the SOC is low. Conversely, if the SOC is high or the battery is fully charged, a larger fraction of the regenerated electrical power may be directed to the eddy current braking device 320.

The energy absorption device may comprise a brake resistor 240 configured to dissipate excess electrical energy from the electric machine 310 and to regulate a voltage level of the braking arrangement. That is, the electrical resistance of the brake resistor 240 may be selected such that a voltage experienced by other components of the braking arrangement, e.g., the eddy current braking device 320 or the energy absorption device 140, 240, is kept at a desired value. To accomplish this, the resistor can be switched in and out according to a configurable duty cycle.

An eddy current braking device 320 comprises at least one electrically conductive component 321, which may be in the shape of a disc, and at least one magnet 322. To increase the ability to generate negative torque, and to improve heat dissipation ability, the eddy current braking device 320 may comprise a plurality of electrically conductive discs 321 attached to a wheel axle 370 for generating braking torque. However, a single disc is of course sufficient for generating braking torque by the eddy current braking device. More than one magnet can of course also be used with one or more respective electrically conductive discs, as illustrated in FIG. 3.

The electrically conductive discs are made from an electrically conductive material, which is herein considered to be a material with an electric conductivity similar to that of a metal, substantially an electric conductivity above 100000 Siemens/m. Optionally, the electrically conducting material may be a metal that reacts weakly to magnetic fields, such as copper or aluminum.

The electrically conductive disc or discs 321 are arranged such that when an axle 370 to which the eddy current braking device 320 is attached is rotating, the electrically conductive disc or discs 321 are also rotating. This may for example be accomplished by attaching the conductive disc 321 directly to the axle 370, or via some form of gear arrangement.

The at least one magnet 322 comprises an electromagnet with a conductive coil and optionally also a core comprising a ferri- or ferromagnetic material, for example iron, permalloy, or ferrite. When an electric current is run through the conductive coils a magnetic field is generated in and around the coil according to Ampere's law. The core concentrates the magnetic flux, thereby producing a stronger magnetic field which increases the torque generated by the eddy current device.

The at least one magnet 322 is arranged such that when the eddy current brakes are engaged the electrically conducting disc 321 is exposed to the magnetic field between the two magnetic poles, with the field lines of the magnetic field substantially perpendicular to the surface of the disc 321. As an example, the magnet 322 could be a magnetic circuit, i.e., an electromagnet where the core is shaped to form a loop, and the electrically conductive disc 321 could be inserted into an air gap of the magnetic circuit. As another example, two magnets 322 could be arranged with the north pole of the first magnet and the south pole of the second magnet facing each other, with the electrically conductive disc 321 inserted between the north and south pole.

When the axle 370 is rotating and the eddy current braking device 320 is engaged, the magnetic field generated by the magnet 322 induces eddy currents in the moving electrically conductive disc 321 as predicted by Faraday's law of induction. Said eddy currents generate a magnetic field that counteracts the magnetic field generated by the magnet, thereby creating a drag force on the electrically conducting disc 321. The electrons forming part of the induced eddy currents are subject to an electrical resistance when moving through the electrically conductive disc 321, causing some of the energy of the moving electrons to be dissipated as heat. Through this mechanism, the kinetic energy of the electrically conductive disc 321 is converted into heat.

When the eddy current braking device 320 is not engaged, the electrically conductive disc 321 is not exposed to a magnetic field from the magnet 322. If the magnet 322 is an electromagnet, the strength of the generated magnetic field depends on the electric current being passed through the conductive coil. In a situation when the eddy current braking device 320 is not engaged, the strength of this electric current may be substantially zero. Thus, advantageously, when an eddy current brake is not engaged, no drag resistance or the like is experienced. This is a major benefit compared to standard service brakes (friction brakes such as disc brakes and drum brakes) which are usually associated with some residual applied brake pad force due to not releasing correctly when not applied, generating rolling resistance and heat.

Figure 4:
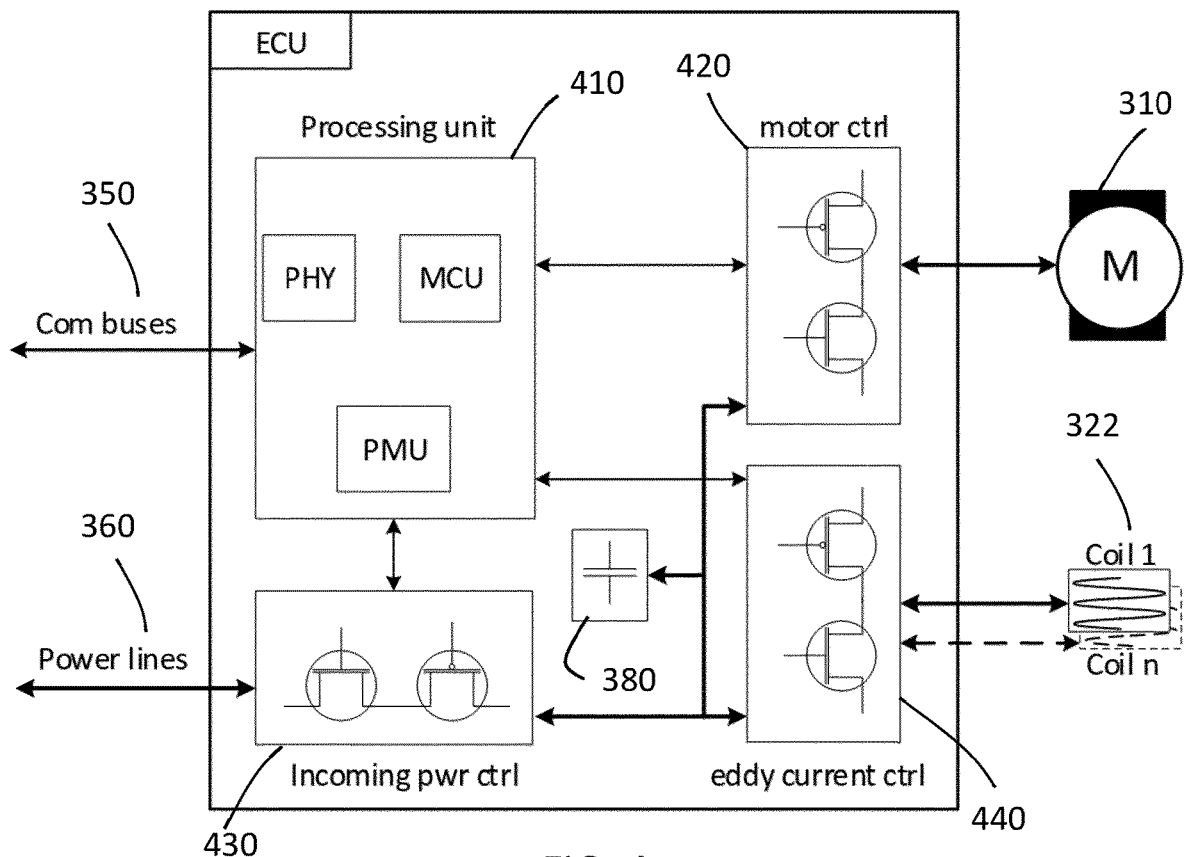
FIG. 4 shows details of a wheel module electronic control unit.

FIG. 4 shows details of an example ECU 330. The ECU comprises a processing unit, which in turn comprises, i.a., a physical layer (PHY) circuit, power management unit (PMU), and memory microcontroller unit (MCU). The processing unit transmits and receives data via the communications port 350. The processing unit is further connected to: a motor power control unit 420, which is connected to the electric machine 310; an eddy current braking device power control unit 440, which is connected to the one or more magnets 322 of the eddy current braking device; and a power port power control unit 430, which is connects the power port 360 to the motor power control unit 420 and the eddy current braking device power control unit 440. These three power control units controls the respective currents and voltages, via the processing unit 410, according to the discussions above.

Figure 5:
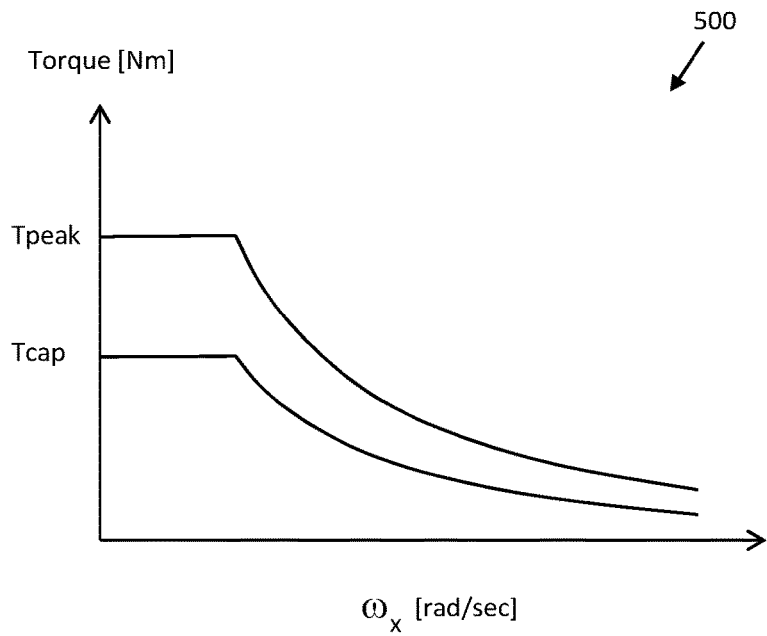
FIG. 5 is a graph illustrating an example of torque vs wheel axle speed.

With reference to FIG. 5, the braking torque capability level Tcap of the electric machine 310 may generally correspond to a torque level that is sustainable over an extended period of time. An extended period of time could in this context be 60 seconds or more. Thus, a sustainable torque level may, e.g., depend on a capacity of the cooling system of the electric machine 310. However, the electric machine 310 is also normally associated with a peak braking torque level Tpeak above a braking torque capability level of the electric machine. This peak braking torque level can be maintained by the electric machine for a limited duration of time. The external control unit 101 may then be configured to request a braking torque level from the electric machine 310 between the peak braking torque level and the braking torque capability level to decelerate the heavy-duty vehicle. A limited duration of time could for example be 30 seconds or less.

Applying a braking torque above Tcap will result in the generation of additional electric power. Optionally, the control unit may be arranged to distribute the additional electric power to the eddy current braking device 320. In addition to the braking torque generated by the electric machine, a braking torque will then be generated by the eddy current braking device, resulting in a higher total braking torque. For example, the total peak braking torque Tpeak may approach four times the total continuous maximum braking torque of the electric machine, though only for the limited amount of time during which a braking torque above Tcap can be sustained. This may for example be useful for emergency braking where high torque is required but only for the limited amount of time it takes to stop the vehicle. In other words, the electric machine 310 can be arranged to generate an increased amount of torque for a limited amount of time. A current generated by the electric machine 310 during such torque overload, i.e., during that limited amount of time, is diverted to the eddy current braking device 320 and thereby increasing a total amount of braking torque. In such case, the communications port 350 can be configured to report the braking torque capability in real-time to the upper layer control.

To summarize, FIG. 5 shows a graph 500 illustrating braking torque as a function of the angular velocity of the wheel axle 370, or, (at a scaling factor corresponding to the total gear ratio) the axle speed of the electric machine. At low to moderate angular velocities, braking torques up to the braking torque capability level Tcap can be applied for an extended period of time, and braking torques up to the peak braking torque level Tpeak can be applied for a limited time. At high angular velocities, the electric machine 310 may become unable to sustain the braking torque, leading to a decrease in braking torque with increasing angular velocity as seen in FIG. 5.

A consequence of this decrease is that less electric power is regenerated, meaning that less electric power from the electric machine 310 is available to power the eddy current braking device 320. According to aspects, the wheel module 300 may be arranged to power the eddy current braking device 320 from a different energy source at high angular velocities of the wheel axle 370. This energy source may for example be a battery 140. According to other aspects, the wheel module 300 may also be arranged to power the eddy current braking device from a different energy source if the function of the electric machine 310 becomes impaired. In other words, the wheel module 300 can be fitted with a local energy buffer 380, e.g., some kind of ESS, like a battery or a super capacitor (as shown in FIG. 4). The buffer can serve at least two purposes. It can even out the output power from the power port 360 such that higher layer charging control systems will receive a more predictable energy output from the device. The buffer can also provide a back-up energy source in case the main vehicle energy source should fail for some reason. This back-up energy source can provide emergency braking via the eddy current braking device for a limited duration of time in case of main energy source failure. The buffer can also be used to boost the torque generated by the eddy current device for limited periods of time, which may be advantageous at very high axle speeds where the power output from regenerative braking may be reduced.

Generally, the ECU 330 may be arranged to request power input from an external energy source via the power port 360 to boost the braking torque by the eddy current device. This request may be due to an insufficient energy output from the electric machine, or due to failure in the electric machine. An external control unit, such as a control unit implementing a VMM function, may grant the request and provide the requested extra energy to the eddy current device for braking.

According to aspects, the ECU 330 of the wheel module 300 is configured to distribute regenerated electrical power from the electric machine 310 between the eddy current braking device 320 and the power port 360 by the power distribution network 340 in dependence of a target deceleration value of the heavy-duty vehicle 100. According to other aspects, the external control unit 101 is arranged to perform a vehicle motion management function comprising force generation and motion support device (MSD) coordination.

Figure 6:
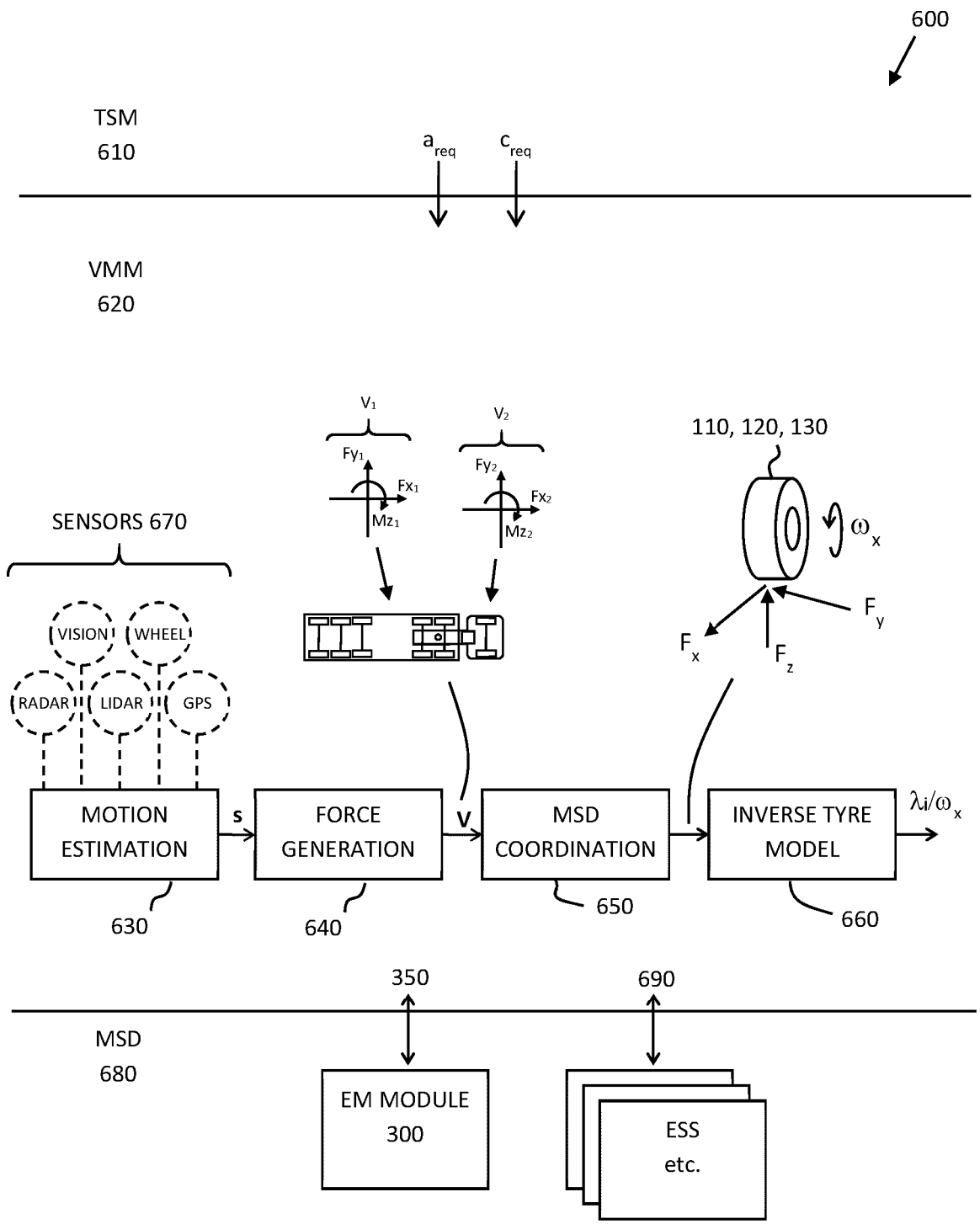
FIG. 6 schematically illustrates functions of a vehicle control system.
Figure 7:
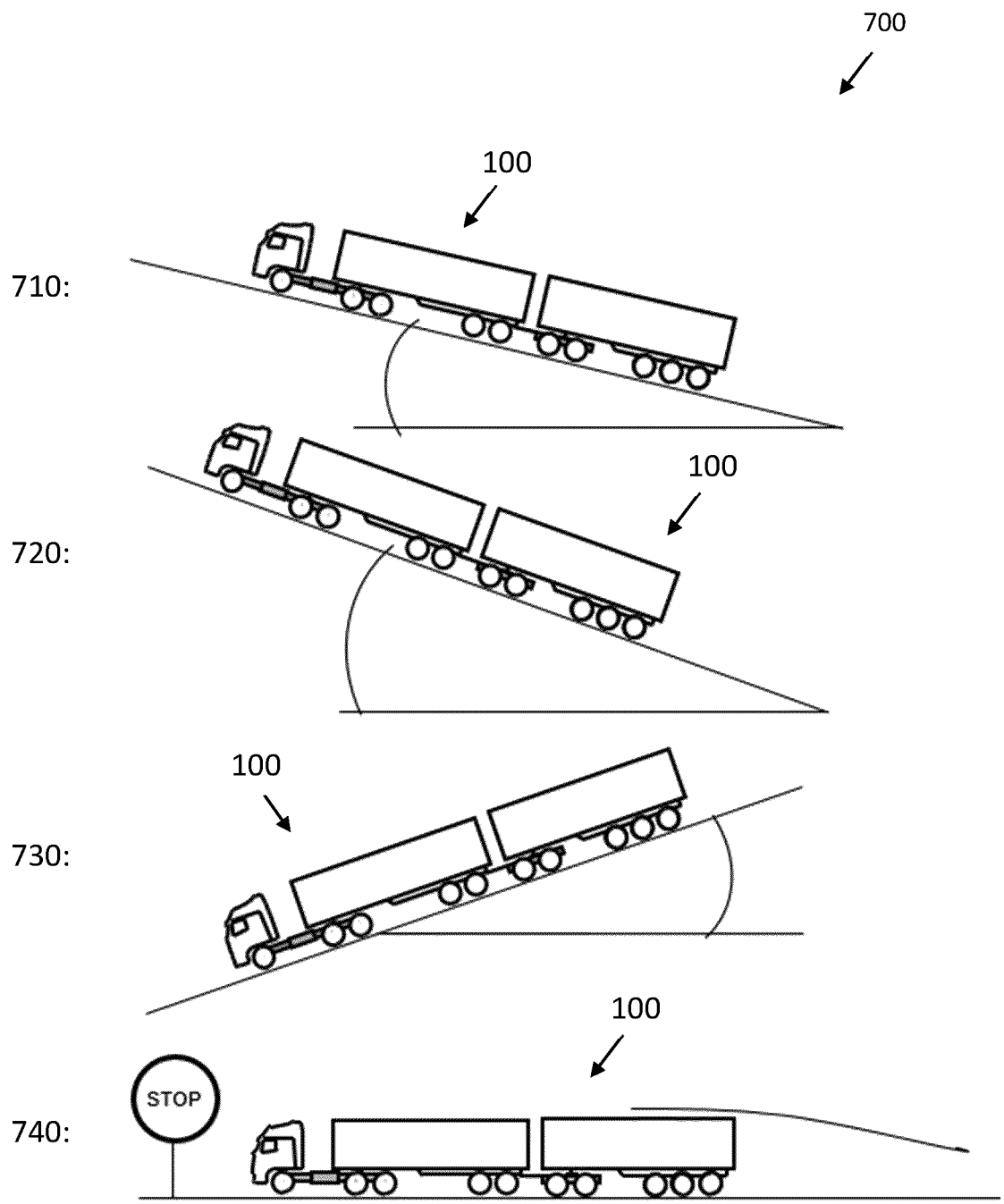
FIG. 7 illustrates some example heavy-duty vehicle use cases.

FIG. 6 schematically illustrates functionality 600 for controlling a wheel 110, 120, 130 by some example MSDs, here comprising the electric machine 310 and the eddy current braking device 320 integrated into the wheel module 300. The control is based on, e.g., measurement data obtained from vehicle sensors 690 such as wheel speed sensors, global positioning system (GPS) sensors, radar sensors, lidar sensors, and also vision-based sensors such as camera sensors and infra-red detectors. An example vehicle motion support device control system is also shown in FIG. 7.

A traffic situation management (TSM) function 610 plans driving operation with a time horizon of, e.g., 10 seconds or so. This time frame corresponds to, e.g., the time it takes for the vehicle 100 to negotiate a curve. The vehicle maneuvers, planned and executed by the TSM, can be associated with acceleration profiles a req and curvature profiles c req which describe a desired vehicle velocity and turning for a given maneuver. An example acceleration profile a req comprises the target deceleration value mentioned above. The TSM function 610 continuously requests the desired acceleration profiles a req and curvature profiles c req from a vehicle motion management (VMM) function 620 which performs force allocation to meet the requests from the TSM in a safe and robust manner. The VMM function continuously feeds back capability information to the TSM function detailing the current capability of the vehicle in terms of, e.g., forces, maximum velocities, and accelerations which can be generated.

Acceleration profiles and curvature profiles may also be obtained from a driver of the heavy-duty vehicle via normal control input devices such as a steering wheel, accelerator pedal and brake pedal. The source of said acceleration profiles and curvature profiles is not within scope of the present disclosure and will therefore not be discussed in more detail herein.

The VMM function 620 operates with a time horizon of about 1 second or so, and continuously transforms the acceleration profiles $a_{req}$ and curvature profiles $c_{req}$ into control commands for controlling vehicle motion functions, actuated by the different MSDs such as the wheel module 300 of the vehicle 100 which in turn report back capabilities to the VMM function 620. The different capabilities are used by the VMM function as constraints in the vehicle control.

The VMM function 620 performs vehicle state or motion estimation 630, i.e., the VMM function 620 continuously determines a vehicle state S comprising positions, speeds, accelerations, and articulation angles of the different units in the vehicle combination by monitoring operations using various sensors 670 arranged on the vehicle 100, often but not always in connection to the MSDs.

The result of the motion estimation 630, i.e., the estimated vehicle state S, is input to a force generation module 640 which determines the required global forces and moments Fx Fy Mz, V=[$V_1$, $V_2$, $V_3$], and for the different vehicle units to cause the vehicle 100 to move according to the requested acceleration and curvature profiles $a_{req}$, $c_{req}$. The required global force vector V is input to an MSD coordination function 650 which allocates wheel forces and also coordinates other MSDs such as steering and suspension. The coordinated MSDs then together provide the desired lateral Fy and longitudinal Fx forces on the vehicle units, as well as the required moments Mz, to obtain the desired motion by the vehicle combination 100.

By determining vehicle unit motion using, e.g., global positioning systems, vision-based sensors, wheel speed sensors, radar sensors and/or lidar sensors, and translating this vehicle unit motion into a local coordinate system of a given wheel (in terms of, e.g., longitudinal and lateral velocity components), it becomes possible to accurately estimate wheel slip in real time by comparing the vehicle unit motion in the wheel reference coordinate system to data obtained from the wheel speed sensor arranged in connection to the wheel.

A tyre model, can be used to translate between a desired longitudinal tyre force $Fx_i$ for a given wheel i and an equivalent wheel slip $\lambda_i$ for the wheel. Wheel slip $\lambda$ relates to a difference between wheel rotational velocity and speed over ground and will be discussed in more detail below. Wheel speed $\omega$ is a rotational speed of the wheel, given in units of, e.g., rotations per minute (rpm) or angular velocity in terms radians/second (rad/sec) or degrees/second (deg/sec). A tyre model is a model of wheel behavior which describes wheel force generated in longitudinal direction (in the rolling direction) and/or lateral direction (orthogonal to the longitudinal direction) as function of wheel slip. In "Tyre and vehicle dynamics", Elsevier Ltd. 2012, ISBN 978-0-08-097016-5, Hans Pacejka covers the fundamentals of tyre models. See, e.g., chapter 7 where the relationship between wheel slip and longitudinal force is discussed.

To summarize, the VMM function 620 manages both force generation and MSD coordination, i.e., it determines what forces that are required at the vehicle units in order to fulfil the requests from the TSM function 610, for instance to accelerate the vehicle according to a requested acceleration profile requested by TSM and/or to generate a certain curvature motion by the vehicle also requested by TSM. The forces may comprise e.g., yaw moments Mz, longitudinal forces Fx and lateral forces Fy, as well as different types of torques to be applied at different wheels.

The interface between VMM and MSDs capable of delivering torque to the vehicle's wheels has, traditionally, been focused on torque-based requests to each MSD from the VMM without any consideration towards wheel slip. However, this approach has significant performance limitations. In case a safety critical or excessive slip situation arises, then a relevant safety function (traction control, anti-lock brakes, etc.) operated on a separate control unit normally steps in and requests a torque override in order to bring the slip back into control. The problem with this approach is that since the primary control of the actuator and the slip control of the actuator are allocated to different electronic control units (ECUs), the latencies involved in the communication between them significantly limits the slip control performance. Moreover, the related actuator and slip assumptions made in the two ECUs that are used to achieve the actual slip control can be inconsistent and this in turn can lead to sub-optimal performance.

Significant benefits can be achieved by instead using a wheel speed or wheel slip-based request on the interface between VMM and the MSD controller, thereby shifting the difficult actuator speed control loop to the MSD controllers, which generally operate with a much shorter sample time compared to that of the VMM function. Such an architecture can provide much better disturbance rejection compared to a torque-based control interface and thus improves the predictability of the forces generated at the tyre road contact patch.

With reference to FIG. 6, the inverse tyre model block 660 translates the required wheel forces $Fx_i$, $Fy_i$ determined for each wheel, or for a subset of wheels, by the MSD coordination block 650 into equivalent wheel speeds $\omega_{wi}$ or wheel slips $\lambda_i$. These wheel speeds or slips are then sent to the respective MSD controllers 680. The MSD controllers report back capabilities which can be used as constraints in, e.g., the MSD coordination block 650. One example of an MSD controller is the wheel module ECU 330 discussed above, which can be communicated with over the communications port 350.

Longitudinal wheel slip $\lambda$ may, in accordance with SAE J670 (SAE Vehicle Dynamics Standards Committee Jan. 24, 2008) be defined as $$\lambda = \frac{R\omega_x - v_x}{\max(|R\omega|, |v_x|)}$$

where R is an effective wheel radius in meters, $\omega_x$ is the angular velocity of the wheel, and $v_x$ is the longitudinal speed of the wheel (in the coordinate system of the wheel). Thus, $\lambda$ is bounded between −1 and 1 and quantifies how much the wheel is slipping with respect to the road surface. Wheel slip is, in essence, a speed difference measured between the wheel and the vehicle. Thus, the herein disclosed techniques can be adapted for use with any type of wheel slip definition. It is also appreciated that a wheel slip value is equivalent to a wheel speed value given a velocity of the wheel over the surface, in the coordinate system of the wheel.

The VMM 620 and optionally also the MSD control units 680, e.g., the ECU 330, maintains information on $v_x$ (in the reference frame of the wheel), while a wheel speed sensor or the like can be used to determine $\omega_x$ (the rotational velocity of the wheel).

The ECU 330 of the wheel module 300 may be arranged to control the electric machine 310 and the eddy current braking device 320 to provide a desired wheel slip level, i.e., a local wheel slip control is achieved through coordination of the electric machine 310 and the eddy current braking device 320. This allows for high bandwidth control that performs with high accuracy and high speed. The desired wheel slip level can, e.g., be determined from an inverse tyre model.

The VMM function 620 may also keep track of the state of charge of the ESS of the vehicle, i.e., the traction batteries or the fuel cell system as well as the current state of any brake resistors. By using the techniques disclosed herein, with reference also to FIG. 3, the implementation of the control by the VMM 620 is simplified, since the VMM can now configure the ECU 330 via the communications port 350 with a maximum output power of the power port 360. The wheel module 300 then controls the power distribution network 340 to maintain the output power of the power port 360 below the maximum output power by distributing power from the at least one electric machine 310 between the eddy current braking device 320 and the power port 360. Thus, the VMM function does not need to handle output powers from the regenerative braking devices in excess of an expected pre-configured maximum level, which level can be configured in real time as a function of the current energy absorption capabilities of vehicle components such as the traction batteries and any brake resistors. The output power from the wheel module 300 may also be more stable if the local energy buffer is implemented, since this local energy buffer can be used to absorb short-term fluctuations in power generated by the electric machine.

In case the VMM function configures a very low output power by the wheel module, the reported braking capability of the wheel module may decrease in response. The total braking capability of the wheel module 300 may also decrease if the electric machine and/or the eddy current device becomes over-heated.

According to aspects, slip control during endurance braking can be improved by simultaneously using several types of braking, i.e., what is known as brake blending. As an example, the ECU 330 can be configured to control the distribution of regenerated electrical power from the electric machine 310 between the eddy current braking device 320 and the power port 360 such that a constant baseline torque level is generated by the eddy current braking device 320. The torque applied by the electric machine can then be modulated to control wheel slip at a desired wheel slip level. With the eddy current braking device 320 generating a baseline torque level, the electric machine 310 can be used to control wheel slip with low latency. Thus, by using a wheel module 300 as discussed herein, the complexity involved in accurate and robust brake blending is shifted to the wheel module, which then provides a less complex interface to the VMM function. As mentioned above, any rapid fluctuation in output power may be smoothed out if a local energy buffer 380 is added to the wheel module design.

Vehicle downhill gradeability relates to the ability of a heavy-duty vehicle to drive down long hills at constant cruising speed. The air resistance and the rolling resistance from the road decelerates the vehicle, while the gravitational pull on the vehicle provides accelerating force. Normally, a retarder or engine brake is used to provide endurance braking. However, the disclosed wheel module 300 is possible to design so that endurance braking is supported without need for additional retarders, friction brakes, or the like.

To guarantee vehicle downhill gradeability, the eddy current braking device and the electric machine can be dimensioned to support a constant cruising speed, e.g., somewhere between 80-110 km/h, during extended downhill driving. To design for downhill gradeability means that the electric machine is dimensioned to provide a continuous negative torque level at a given level and also arranged to distribute the regenerated energy to the eddy current braking device when the energy absorption capability of the energy absorption device is depleted. The eddy current braking device is dimensioned to absorb this energy level. Thus, vehicle downhill gradeability may be guaranteed, at least for a range of driving conditions.

The electric machine 310, the eddy current braking device 320, and the power distribution network 340 may be integrally formed as a single unit in the wheel module 300. The wheel module 300 comprises a power port 360 for feeding and receiving electrical energy to and from the energy absorption device 140, 240. The wheel module 300 further comprises a communications port 350 by which it can be connected to the external control unit 101. The wheel module 300 may comprise an additional communications port. This provides redundancy to the control system. Any of the communications port 350 and the additional communications port can be a wireless port.

The external control unit 101 may be arranged to send, e.g., a torque request or a wheel slip request as described above to the wheel end module together with an energy absorption capability of an energy absorption device 140, 240 that is external to the wheel end module. Within the wheel end module, the requested torque or wheel slip can then be generated by the electric machine 310 and the eddy current braking device 320, while, at the same time, the output power of the power port 360 is maintained below the maximum output power. This integrated functionality can be verified on the component level and simplifies overall dimensioning of the vehicle electric system.

According to aspects, the electric machine 310 in the wheel module 300 is an axial flux electric machine. In contrast to a radial flux electric machine, in which the stator forms a substantially cylindrical shell concentric with the substantially circular rotor and the magnetic flux is directed radially between the rotational axis of the rotor and the stator, the magnetic flux in an axial flux electric machine is directed along the rotational axis of the rotor. Both the rotor and the stator in an axial flux electric machine may be thought of as discs, placed next to each other with the axis of rotation of the rotor perpendicular to both discs. During operation, the magnetic flux between rotor and stator will then be parallel to the axis of rotation. Optionally, more than one stator may be used. Axial flux electric machines may be associated with higher power densities and a less complicated manufacturing process compared to radial flux electric motors.

FIG. 7 illustrates four use cases 700 which a heavy-duty vehicle 100 must be able to operate in. The vehicle 100 must be able to start in slopes 710 (startability), even if the vehicle 100 is heavily loaded and the road friction is not ideal. The vehicle must also be able to negotiate even steeper slopes at constant velocity 720, e.g., 70 km/h (positive gradeability). Downhill gradeability performance 730 is perhaps even more important, which means that the vehicle 100 must be able to limit speed when driving downhill for longer distances (endurance braking). Finally, acceleration and braking capability implies that peak torque requirements, both on positive and on negative torque, must be met by the vehicle MSDs.

The required longitudinal torque can be expressed as $$F_{x,req} = m_{GCW} a_{x,req} + 0.5 C_d A_f \rho_{air} v_x^2 + g C_r m_{GCW} + m_{GCW} g \sin\left(\frac{s}{100}\right)$$

where $m_{GCW}$ is the vehicle gross combination weight, $a_{x,req}$ is the required acceleration (which is zero or very small for use cases 710, 720 and 730), $C_d A_f$ is the product of air drag coefficient $C_d$ and vehicle front area $A_f$, $\rho_{air}$ represents air density, $v_x$ is the vehicle speed, g is the gravitational constant, $C_r$ is rolling resistance, and s is a slope percentage between 0 and 100.

In uphill driving positive torque scenarios, the terms $0.5 C_d A_f \rho_{air} v_x^2$ and $gC_r m_{GCW}$ must be overcome by the propulsion MSDs, while in downhill scenarios the terms instead help to brake the vehicle 100. This means that the electric machine must be dimensioned to support positive torque sufficient for use cases 710 and 720, while the combination of the eddy current braking device and the electric machine must be dimensioned to provide a combined negative torque to support use cases 730 and hard braking according to use case 740.

It is appreciated that the vehicle 100 will, most likely, comprise several wheel modules 300 which will be coordinated to meet torque requirements, as discussed in connection to FIG. 6 above.

There is also herein disclosed a heavy-duty vehicle unit 100 comprising one or more wheel modules 300 according to the discussions above and an external control unit 101 arranged to control vehicle motion.

Figure 8:
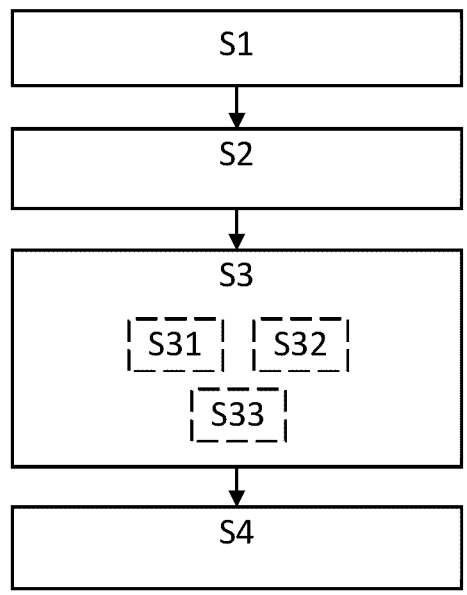
FIG. 8 is a flow chart illustrating a method.

The flowchart in FIG. 8 shows a method for decelerating a heavy-duty vehicle 100, performed by an electronic control unit (ECU) 330 comprised in a wheel module 300. The wheel module 300 also comprises at least one electric machine 310 arranged for regenerative braking, an eddy current braking device 320, a communications port 350 arranged for communication with an external control unit 101 and a power distribution network 340 arranged to connect the electric machine 310 to the eddy current braking device 320 and to a power port 360 arranged to input and to output electrical power to and from the wheel module 300. The method comprises
- obtaining S1 a deceleration request via the communications port 350 indicative of a desired braking torque,
- obtaining S2 configuration data via the communications port 350 indicative of a maximum output power of the power port 360,
- applying S3 braking torque by any of the electric machine 310 and the eddy current braking device 320, and
- controlling S4 the power distribution network 340 to maintain the output power of the power port 360 below the maximum output power by distributing power from the at least one electric machine 310 between the eddy current braking device 320 and the power port 360.

In light of the discussions above, it is understood that the application of braking torque can be done in many different ways. For example, braking torque may be applied only by the electric machine 310 and all regenerative power is distributed to an electrical energy absorption device 140, 240 connected to the power port. In another example, braking torque is applied by the electric machine 310 and regenerative current is distributed to the eddy current braking device 320, which therefore also provides braking torque. In yet another example, braking torque is applied only by the eddy current braking device 320, which is powered by an external ESS 140 connected to the power port 360, or by an internal back-up energy source 380.

According to aspects, the method further comprises applying S31 an increased amount of torque by the electric machine 310 for a limited amount of time, and diverting S32 a current generated by the electric machine 310 during that limited amount of time to the eddy current braking device 320, thereby increasing a total amount of braking torque provided by the wheel module 300.

According to aspects, the method further comprises controlling S33 the electric machine 310 and the eddy current braking device 320 to provide a desired wheel slip level.

Figure 9:
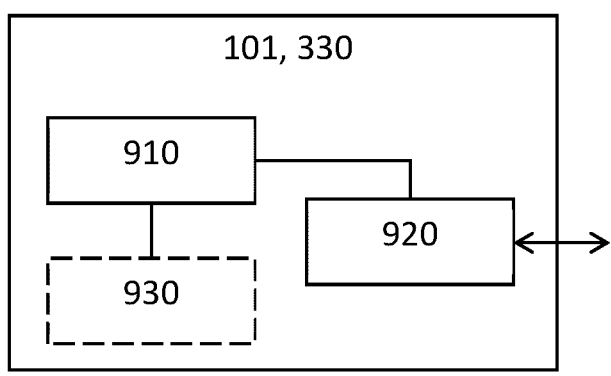
FIG. 9 schematically illustrates a control unit.

FIG. 9 schematically illustrates, in terms of a number of functional units, the components of an electronic control unit (ECU) 330 according to embodiments of the discussions and methods disclosed herein. This ECU 330 may be comprised in a wheel module 300. Processing circuitry 910 is provided using any combination of one or more of a suitable central processing unit CPU, multiprocessor, microcontroller, digital signal processor DSP, etc., capable of executing software instructions stored in a computer program product, e.g., in the form of a storage medium 930. The processing circuitry 910 may further be provided as at least one application specific integrated circuit ASIC, or field programmable gate array FPGA.

Particularly, the processing circuitry 910 is configured to cause the ECU 330 to perform a set of operations, or steps, such as the methods discussed in connection to FIG. 8. For example, the storage medium 930 may store the set of operations, and the processing circuitry 910 may be configured to retrieve the set of operations from the storage medium 930 to cause the external control unit 101 to perform the set of operations. The set of operations may be provided as a set of executable instructions. Thus, the processing circuitry 910 is thereby arranged to execute methods as herein disclosed.

The storage medium 930 may also comprise persistent storage, which, for example, can be any single one or combination of magnetic memory, optical memory, solid state memory or even remotely mounted memory.

The ECU 330 may further comprise an interface 920 for communications with at least one external device, such as an electric machine or a gearbox, as well as other control units on the vehicle 100. As such the interface 920 may comprise one or more transmitters and receivers, comprising analogue and digital components and a suitable number of ports for wireline or wireless communication.

The processing circuitry 910 controls the general operation of the ECU 330, e.g., by sending data and control signals to the interface 920 and the storage medium 930, by receiving data and reports from the interface 920, and by retrieving data and instructions from the storage medium 930. Other components, as well as the related functionality, of the control node are omitted in order not to obscure the concepts presented herein.

The functional units of FIG. 9 may also be comprised in a vehicle control unit 101, such as a control unit for performing one or more of the functions discussed above in connection to FIG. 6.

Figure 10:
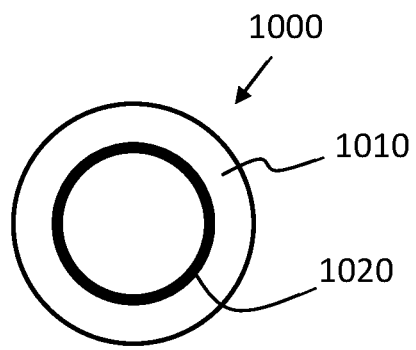
FIG. 10 shows an example computer program product.

FIG. 10 illustrates a computer readable medium 1010 carrying a computer program comprising program code means 1020 for performing, e.g., the methods illustrated in FIG. 8, when said program product is run on a computer. The computer readable medium and the code means may together form a computer program product 1000.

The invention claimed is:

1. A wheel module arranged to generate torque to accelerate and to decelerate a heavy-duty vehicle, the wheel module comprising at least one electric machine arranged for regenerative braking, an eddy current braking device, and an electronic control unit, ECU, the wheel module further comprising a communications port arranged for communication with an external control unit and a power distribution network arranged to connect the electric machine to the eddy current braking device and to a power port arranged to input and to output electrical power to and from the wheel module, wherein the ECU is arranged to obtain configuration data via the communications port indicative of a maximum output power of the power port, and to control the power distribution network to maintain the output power of the power port below the maximum output power by distributing power from the at least one electric machine between the eddy current braking device and the power port, and wherein the ECU is arranged to control the electric machine and the eddy current braking device to provide a desired wheel slip level in response to a wheel slip or wheel speed request obtained via the communications port from the external control unit.

2. The wheel module according to claim 1, wherein the electric machine is arranged to generate an increased amount of torque for a limited amount of time, wherein a current generated by the electric machine during that limited amount of time is diverted to the eddy current braking device, thereby increasing a total amount of braking torque.

3. The wheel module according to claim 1, further comprising a local energy buffer.

4. The wheel module according to claim 1, comprising an additional communications port arranged to provide a redundant communications function to the wheel module.

5. The wheel module according to claim 1, wherein the ECU is configured to distribute regenerated electrical power from the electric machine between the eddy current braking device and the power port by the power distribution network in dependence of a target deceleration value of the heavy-duty vehicle.

6. The wheel module according to claim 1, wherein the ECU is configured to control the distribution of regenerated electrical power from the electric machine between the eddy current braking device and the power port such that a constant baseline torque level is generated by the eddy current braking device, wherein the torque applied by the electric machine is modulated to control wheel slip at a desired wheel slip level.

7. The wheel module according to claim 1, wherein the electric machine, the eddy current braking device, and the ECU are integrally formed in a single unit.

8. The wheel module according to claim 1, wherein the electric machine is an axial flux electric machine.

9. A heavy-duty vehicle unit comprising one or more wheel modules according to claim 1, and an external control unit arranged to control vehicle motion.

10. A method for decelerating a heavy-duty vehicle, performed by an electronic control unit, ECU, comprised in a wheel module, the wheel module also comprising at least one electric machine arranged for regenerative braking, an eddy current braking device, a communications port arranged for communication with an external control unit, and a power distribution network arranged to connect the electric machine to the eddy current braking device and to a power port arranged to input and to output electrical power to and from the wheel module, the method comprising obtaining a deceleration request from the external control unit indicative of a desired braking torque, wherein the deceleration request comprises a wheel slip or wheel speed request, obtaining configuration data via the communications port indicative of a maximum output power of the power port, applying braking torque by any of the electric machine and the eddy current braking device, controlling the electric machine and the eddy current braking device to provide a desired wheel slip level in response to the wheel slip or wheel speed request, and controlling the power distribution network to maintain the output power of the power port below the maximum output power by distributing power from the at least one electric machine between the eddy current braking device and the power port.

11. The method according to claim 10, further comprising applying an increased amount of torque by the electric machine for a limited amount of time, and diverting a current generated by the electric machine during that limited amount of time to the eddy current braking device, thereby increasing a total amount of braking torque.

12. An electronic control unit, ECU, comprising processing circuitry configured to perform a method according to claim 10.

13. A computer program comprising program code means for performing a method according to claim 10 when said program is run on a computer or on processing circuitry of an electronic control unit, ECU.

* * * * *